United States Patent
Maeda et al.

(10) Patent No.: US 6,268,304 B1
(45) Date of Patent: *Jul. 31, 2001

(54) PLATE GLASS AND SUBSTRATE GLASS FOR ELECTRONICS

(75) Inventors: Kei Maeda; Seiki Ohara; Yasumasa Nakao, all of Yokohama (JP)

(73) Assignee: Asahi Glass Company Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/300,311

(22) Filed: Apr. 28, 1999

(30) Foreign Application Priority Data

Apr. 28, 1998 (JP) .................................................. 10-119401
Jul. 28, 1998 (JP) .................................................. 10-212804

(51) Int. Cl.$^7$ ........................... C03C 3/089; C03C 3/091; C03C 3/093; C03C 3/097
(52) U.S. Cl. .................................. 501/65; 501/63; 501/64; 501/66; 501/67; 501/69; 501/70; 501/72
(58) Field of Search ................................ 501/63, 64, 65, 501/66, 67, 69, 70, 72

(56) References Cited

U.S. PATENT DOCUMENTS

| | | | |
|---|---|---|---|
| 3,540,893 | * 11/1970 | Petticrew | 501/66 |
| 3,984,252 | * 10/1976 | Kiefer . | |
| 4,565,791 | * 1/1986 | Boudot et al. | 501/66 |
| 5,459,109 | 10/1995 | Lapp . | |
| 5,599,754 | 2/1997 | Maeda et al. . | |
| 5,631,195 | 5/1997 | Yanagisawa et al. . | |
| 5,876,472 | * 3/1999 | Gros et al. | 65/30.1 |
| 5,888,917 | 3/1999 | Kawaguchi et al. . | |

(List continued on next page.)

FOREIGN PATENT DOCUMENTS

| | | |
|---|---|---|
| 0 795 522 | 9/1997 | (EP) . |
| 0 850 891 A1 | 7/1998 | (EP) . |
| 0 853 070 A1 | 7/1998 | (EP) . |
| 2 317 611 | 4/1998 | (GB) . |
| 62-270439 | 11/1987 | (JP) . |
| 3-40933 | 2/1991 | (JP) . |
| 7-257937 | 10/1995 | (JP) . |
| 9-202641 | 8/1997 | (JP) . |
| 9-249430 | 9/1997 | (JP) . |
| 9-255354 | 9/1997 | (JP) . |

(List continued on next page.)

OTHER PUBLICATIONS

S. M. Wiederhorn, "Fracture Surface Energy of Glass", Journal of the American Ceramic Society, vol. 52, No. 2, Feb. 1969, pp. 99–105.

Robert J. Eagan, et al. "Effect of Composition on the Mechanical Properties of Aluminosilicate and Borosilicate Glasses", Journal of the American Ceramic Society, vol. 61, No. 1–2, Jan.–Feb. 1978, pp. 27–30.

S. T. Gulati, et al. "P–30: Mechanical Reliability of AMLCD Glass Substrates", SID '96 Digest. 1996, pp. 518–521 (No month).

Derwent Abstracts, Accission No. 98–379013/33, EP–854117 A1, Jul. 22, 1998.

*Primary Examiner*—David R. Sample
(74) *Attorney, Agent, or Firm*—Oblon, Spivak, McClelland, Maier & Neustadt, P.C.

(57) ABSTRACT

A plate glass containing $B_2O_3$, having a total content of $Li_2O$, $Na_2O$ and $K_2O$ of from 0 to 13 mol %, a content of BaO of from 0 to 0.8 mol % and a content of $SiO_2$ of from 50 to 75 mol %, and having an average linear thermal expansion coefficient of from $75 \times 10^{-7}$ to $120 \times 10^{-7}/°$ C. in a range of from 50 to 350° C., a strain point of at least 550° C., a density of at most 2.65 g/cm$^3$ at 20° C. and an oxygen atom density of from $7.2 \times 10^{-2}$ to $9.0 \times 10^{-2}$ mol/cm$^3$ at 20° C.

10 Claims, 1 Drawing Sheet

U.S. PATENT DOCUMENTS

| | | | |
|---|---|---|---|
| 5,656,558 | * 8/1997 | Brix et al. | 501/70 |
| 5,776,844 | 7/1998 | Koch et al. . | |
| 5,780,371 | 7/1998 | Rifqi et al. . | |
| 5,780,373 | 7/1998 | Yanagisawa et al. . | |
| 5,854,152 | * 12/1998 | Kohli et al. | 501/66 |
| 5,854,153 | * 12/1998 | Kohli | 501/70 |
| 5,858,897 | 1/1999 | Maeda et al. . | |

FOREIGN PATENT DOCUMENTS

| | | |
|---|---|---|
| 9-255355 | 9/1997 | (JP) . |
| 9-255356 | 9/1997 | (JP) . |
| 9-301732 | 11/1997 | (JP) . |
| 10-25128 | 1/1998 | (JP) . |
| 10-25129 | 1/1998 | (JP) . |
| 10-25130 | 1/1998 | (JP) . |
| 10-40820 | 2/1998 | (JP) . |
| 10-45423 | 2/1998 | (JP) . |
| 96/11887 * | 4/1996 | (WO) . |
| WO 98/49111 | 11/1998 | (WO) . |

* cited by examiner

PLATE GLASS AND SUBSTRATE GLASS FOR ELECTRONICS

The present invention relates to a plate glass having high resistance against the progress of fracture, i.e. a plate glass having high fracture toughness. Particularly, it relates to a plate glass suitable as a substrate for electronics, for which high thermal resistance and a thermal expansion coefficient of a same level as usual soda lime silica glass, are required.

In recent years, industry of large size flat display panels represented by color plasma display panels (hereinafter referred to as color PDP) has shown a remarkable growth, and glasses to be used as substrates thereof have been diversified. Heretofore, usual soda lime silica glass has been widely used for substrates for large sized flat display panels. One of the reasons is such that the thermal expansion coefficients of various glass frit materials to be used as constituting part materials for panels, including inorganic sealing materials, can easily be adjusted to the thermal expansion coefficient of soda lime silica glass.

On the other hand, in order to reduce deformation or thermal shrinkage of glass substrates in the heat treatment process during the production of large sized flat display panels, it is strongly desired to improve the thermal resistance of the glass for substrates. For this purpose, a so-called high strain point glass has been widely used as a substrate, which has a thermal expansion coefficient of the same level as soda lime silica glass and has a higher strain point and which has an alkali content controlled to be low in order to improve the electrical insulating property.

However, such a high strain point glass is brittle as compared with soda lime silica glass and thus has had a problem that it is likely to break in the production process. Further, such a high strain point glass has had another problem that its density is large, whereby it has been difficult to reduce the weight of the large sized flat display panel.

To solve such problems, for example, JP-A-9-301733 proposes a glass for substrate which has a low density and which is hardly flawed. The characteristic of being hardly flawed is effective in a case where a flaw as a fracture origin is likely to be imparted in the process for producing a panel, but it is not necessarily effective in a case where a flaw is imparted during processing treatment such as cutting prior to such a production process. It is usual that many flaws which are likely to be fracture origin, are already present at an edge portion of the glass in the processing treatment such as cutting. In such a case, in order to prevent breakage of the glass, it has been necessary to present a plate glass which essentially has high resistance against the progress of fracture due to a tensile stress, i.e. a plate glass having high fracture toughness.

Usually, there is the following relation between the above mentioned fracture toughness ($K_{IC}$) and the fracture strength (σ):

$$\sigma = K_{IC}/(Y \times c^{1/2})$$

where c is the size of the flaw which causes fracture, and Y is a constant determined by the shape of the flaw.

As methods for evaluating the fracture toughness of brittle materials, many proposals have heretofore been made. JIS R1607 stipulates two methods i.e. a single edge precracked beam method (SEPB method) and an indentation fracture method (IF method), as methods for testing the fracture toughness of fine ceramics. According to a commentary of the above stipulations, the SEPB method is recommended as a method which should be employed mainly for the reason that the theoretical ground is clear. On the other hand, the IF method is described as a method for inspecting the length of a crack formed when a Vickers indenter is pressed against the surface of the material, which is employed for the reason that it is very simple, and the interrelation with the values measured by the SEPB method has been generally confirmed. In this connection, the discussion in JP-A-9-301733 is made on the basis of the IF method, and although a substrate glass which is hardly flawed, is disclosed, it can hardly be said as aimed at increasing the resistance against the progress of fracture due to a tensile stress.

Accordingly, a discussion of the fracture toughness itself is considered to be preferably made on the basis of a method for measuring the resistance against the growth of a crack due to a tensile stress. As a typical method therefor, the above mentioned SEPB method, a chevron notch method (BBCN method) or a double cantilever method (DCB method) may, for example, be mentioned. Here, the BBCN method is a method for measuring fracture toughness by carrying out a bending test with respect to a test specimen having a chevron-type notch formed at its center portion, and the DCB method is a method for measuring the load required for the progress of a crack by directly pulling both ends of the crack with respect to a test specimen having the crack introduced. The fracture toughness mentioned hereinafter is a value measured by the SEPB method, the BBCN method or the DCB method.

According to J. Am. Ceram. Soc. 52 (1969), No.2, p99–105 (hereinafter referred to as Document 1), the fracture toughness of soda lime silica glass is 0.75 MPa·m$^{1/2}$.

Silicate glasses having fracture toughness equivalent to or higher than the fracture toughness of soda lime silica glass, have heretofore been known. For example, Document 1 discloses an aluminosilicate glass having a fracture toughness of 0.91 MPa·m$^{1/2}$, and J. Am. Ceram. Soc. 61 (1978), No.1–2, p27–30 (hereinafter referred to as Document 2) discloses an alkali borosilicate glass having a fracture toughness of 0.94 MPa·m$^{1/2}$. Further, SID'96 Digest of Technical Papers (1996) p518 discloses that the fracture toughness of an alkali free glass for TFT-LCD substrate is from 0.8 to 0.83 MPa·m$^{1/2}$. The fracture toughness of these glasses is higher than the fracture toughness of soda lime silica glass, and such glasses may be regarded essentially as glasses having the resistance against the progress of fracture improved. However, each of such glasses having high fracture toughness has a thermal expansion coefficient which is too small as compared with the thermal expansion coefficient of soda lime silica glass, or a strain point which is as low as lower than 550° C., whereby, in many cases, such a glass has not been applicable to a substrate glass for electronics such as a substrate for color PDP.

On the other hand, the relation between the glass composition and the fracture toughness is discussed, for example, in Document 1 or 2. Generally, the relation between the fracture toughness ($K_{IC}$), and the Young's modulus (E) and the fracture surface energy (γ) of the material, is represented by the following formula:

$$K_{IC} = (2 \times E \times \gamma)^{1/2}$$

From this formula, it is evident that in order to improve the fracture toughness, the Young's modulus and the fracture surface energy may be increased. Among them, the Young's modulus is a physical value which can relatively easily be measured, and its relation with the glass composition has been known to some extent. However, the fracture surface energy is a physical value which is rather difficult to measure, and its relation with the glass composition has little been reported. In fact, Document 1 discloses a relation between the Young's modulus and the fracture surface energy, but the relation differs depending upon the glass system, and no clear interrelation between the two has been obtained. Therefore, it is difficult to estimate the fracture toughness from the relation between the glass composition and the Young's modulus. Further, a glass containing a substantial amount of e.g. Si, Al or B which has a high single bond strength with oxygen, is believed to usually have high fracture toughness, but as disclosed in Document 2, such characterization is not applicable to some glasses.

As mentioned above, the mechanism for development of fracture toughness in a glass having high resistance against the progress of fracture, has not yet been sufficiently clarified, and for such clarification, it is believed necessary to clarify the complex glass structures and the mechanism of fracture of glasses. Accordingly, extensive experiments and trial and error have been required to obtain a glass which not only satisfies the thermal expansion coefficient and the condition relating to the strain point required for e.g. a substrate glass for color PDP but also has high fracture toughness.

The present invention has been made to solve the above problems, and its object is to obtain a plate glass which has a thermal expansion coefficient of the same level as soda lime silica glass and a strain point higher than soda lime silica glass and which has fracture toughness of the same level or higher than the fracture toughness of soda lime silica glass, and to obtain a substrate glass for electronics employing it.

The present invention provides a plate glass having a total content of $Li_2O$, $Na_2O$ and $K_2O$ of from 0 to 13 mol %, a content of BaO of from 0 to 0.8 mol % and a content of $SiO_2$ of from 50 to 75 mol %, and having an average linear thermal expansion coefficient of from $75 \times 10^{-7}$ to $120 \times 10^{-7}$/° C. in a range of from 50 to 350° C., a strain point of at least 550° C., a density of at most 2.65 g/cm$^3$ at 20° C. and an oxygen atom density of from $7.2 \times 10^{-2}$ to $9.0 \times 10^{-2}$ mol/cm$^3$ at 20° C.

Further, the present invention provides a plate glass having a total content of $Li_2O$, $Na_2O$ and $K_2O$ of from 0 to 13 mol % and a content of $SiO_2$ of from 50 to 75 mol %, and having an average linear thermal expansion coefficient of from $75 \times 10^{-7}$ to $120 \times 10^{-7}$/° C. in a range of from 50 to 350° C., a strain point of at least 550° C., a density of at most 2.65 g/cm$^3$ at 20° C. and an oxygen atom density of from $7.3 \times 10^{-2}$ to $9.0 \times 10^{-2}$ mol/cm$^3$ at 20° C.

Such plate glasses are most suitable as substrate glasses for electronics with respect to any of the thermal resistance, the density and the fracture strength. Here, substrate glasses for electronics are meant for substrates for flat panel displays such as color PDP, plasma address liquid crystal (PALC) and field emission display (FED), and substrates for information recording media such as substrates for magnetic disks.

The present inventors have extensively studied various indices which may be accurately explain the fracture toughness of glasses heretofore known. As a result, it has been found that there is a strong interrelation between the fracture toughness of glass and the number of oxygen atoms contained in a unit volume of glass i.e. the oxygen atoms density. Namely, with an increase in the oxygen atom density, the fracture toughness increases as well. The reason is not clearly understood, but it may be explained that with a glass having a structure wherein oxygen atoms are densely present, it will be required to cut more bonds in the progress of fracture, whereby the resistance against the progress of fracture increases i.e. the fracture toughness increases.

The oxygen atom density is a convenient physical value which can easily be obtained without carrying out a complex analysis, calculation or measurement, so long as the glass composition and the density are known, and it has a strong interrelation with the fracture toughness, which can be practically adequately useful, and can be used as an index which can explain the fracture toughness.

The oxygen atom density ($D_{oxygen}$) is calculated from the glass composition represented by components $A_i$ and their molar fractions $C_i$ and the density (d, the unit being g/cm$^3$) of glass at 20° C., as follows.

The molecular weight of each component is represented by $m_i$, the percentage of the molar fraction of each component is represented by $c_i$, the number of oxygen atoms in each component is represented by $x_i$, and the average molecular weight of glass is represented by m. Here, $m = \Sigma (m_i \times c_i / 100)$, $c_i = C_i \times 100$, and $\Sigma$ is a symbol for summing up with respect to all components of the glass.

$$D_{oxygen} = d \times \Sigma (x_i \times c_i / 100) / m$$

Table 1 shows the compositions represented by mol %, the fracture toughness (the unit being MPa·m$^{1/2}$), the densities (the unit being g/cm$^3$), the oxygen atom densities (the unit being $10^{-2}$ mol/cm$^3$), the thermal expansion coefficients (the unit being $10^{-7}$/° C.), the strain points (the unit being ° C.) and the fracture strength (unit being MPa) of various glasses.

Glass A is soda lime silica glass, glasses B to D are high strain point glasses having thermal expansion coefficients of the same level as the thermal expansion coefficient of soda lime silica glass, glasses E to G are alkali-free glasses, glasses H to I are glasses disclosed in Document 1, and glasses J to K are glasses disclosed in Document 2. With respect to glasses H to K, data disclosed in Documents 1 and 2 were partially copied.

The fracture toughness of glasses A to G was measured by the BBCN method. In the present specification, the BBCN method is a three point bending test or a four point bending test, which will be described hereinafter. In this paragraph, the one in brackets ( ) is the condition for the four point bending test. A chevron-type notch was formed at the center portion of a test specimen having a thickness of 6 mm (8 mm), a width of 8 mm and a length of 80 mm. Using a Tensilon type strength testing apparatus, a bending test was carried out at a crosshead speed of 0.005 mm/min, so that constant fracture takes place from the forward end of the notch imparted on the test specimen supported with a span of 60 mm (64 mm). The above span in the four point bending test was 16 mm. In order to avoid the effect of fatigue of the glass due to moisture, the measurement was carried out in a dry nitrogen atmosphere. The data of the fracture toughness of glasses H to K are those copied from Documents 1 and 2. Hereinafter, the fracture toughness in the present specification is the fracture toughness measured by the above described BBCN method.

The density was measured by an Archimedes method with respect to a sample of about 20 g. The thermal expansion coefficient was measured in accordance with JIS R3102. The strain point was measured in accordance with JIS R3103.

The fracture strength was measured by the following method.

A Vickers indenter was pressed against the center of a mirror finished surface of a test specimen having a thickness of about 3 mm, a width of about 8 mm and a length of about 50 mm, to form flaws from four corners of the impression. The direction in which the Vickers indenter was pressed, was adjusted so that the directions of the flaws would be vertical to the long side or the short side of the test specimen. With respect to the test specimen thus flawed, a three point bending test was carried out with a span of 30 mm so that the maximum bending stress would be exerted to the flawed portion. In order to avoid the deterioration in strength due to fatigue of the glass, the bending test was carried out in a dry nitrogen atmosphere.

The fracture strength σ was obtained in accordance with the following formula:

$$\sigma = 3 \times P \times L / (2 \times b \times h^2)$$

where P is the fracture load, L is the span, b is the width of the test specimen, and h is the thickness of the test specimen.

On the other hand, the vicinity of the Vickers impression was observed by a microscope immediately before the bending test, whereby the length of the flaw vertical to the long side of the test specimen among the flaws introduced crisscross, was measured. The length (c) of the flaw measured and the fracture strength (σ) were plotted on a log—log graph, and then linear regression was carried out to obtain the fracture strength ($\sigma_{100}$) corresponding to 100 μm in the length of the flaw. Here, data of a test specimen in which flaws were not uniformly formed from the four corners of the Vickers impression or of a test specimen which was broken from the edge without fracture from the flaws in the bending test, were excluded. The data of σ100 are shown in the column for the fracture strength in Table 1 (the unit being MPa). Hereinafter, the fracture strength in the present specification is $\sigma_{100}$.

In the accompanying drawing, FIG. 1 is a graph in which the relation between the oxygen atom density (the unit being $10^{-2}$ mol/cm$^3$) and the fracture toughness (the unit being MPa·m$^{1/2}$) was plotted on the basis of the data shown in Table 1. In the Figure, a fitting linear line is shown, and a strong linear interrelation is observed between the two. Taking also the error in measuring the fracture toughness into consideration, it is apparent that the oxygen atom density is an excellent index for the fracture toughness.

As is evident from Table 1, the fracture toughness increases with an increase of the oxygen atom density. Further, it is noteworthy that with glass D, the fracture toughness is not so high in spite of the fact that the total content of SiO$_2$, Al$_2$O$_3$ and B$_2$O$_3$ which have high single bond strength with oxygen, is large as compared with glass A which is soda lime silica glass. Such results have not been expected from the conventional way of thinking.

From the foregoing knowledge, the following policy will be obtained. Namely, in order to obtain a glass having fracture toughness of the same level or higher than the fracture toughness of soda lime silica glass, the oxygen atom density may be adjusted to be the same level or higher than that of the soda lime silica glass. In order to increase the oxygen atom density, an oxide having a cation with a small ion radius and having a small molar volume, may be introduced into the glass composition. As the data for the molar volume, the Appen's coefficient may be used which is used when the physical property of glass is predicted from an additive rule.

Table 2 shows the Appen's coefficients (the unit being cm$^3$/mol) of the molar volumes of various oxides and the oxygen atom densities (the unit being $10^{-2}$ mol/cm$^3$) of various oxides calculated from the above Appen's coefficients. As is evident from Table 2, B$_2$O$_3$ is a preferred component in order to increase the oxygen atom density of glass, and this agrees very well to the fact that glasses E to H and glass J in Table 1 show high oxygen atom densities. Further, it is readily expected that Li$_2$O, Ti$_2$O and ZrO$_2$ are also preferred components. On the other hand, an oxide containing a cation with a large ion radius, such as K$_2$O or BaO, has a large molar volume and is an undesirable component in order to increase the fracture toughness, and such an oxide should be at the minimum level if used for obtaining other properties.

It is not essential that the plate glass of the present invention contains Li$_2$O, Na$_2$O and K$_2$O, but it may contain them. When it contains them, the total of their contents is at most 13 mol %. If the total content exceeds 13 mol %, the electrical insulating property deteriorates.

The content of SiO$_2$ in the plate glass of the present invention is from 50 to 75 mol %. If it is less than 50 mol %, the density tends to be too high. If it exceeds 75 mol %, the thermal expansion coefficient tends to be too small.

The thermal expansion coefficient of the plate glass of the present invention is from $75 \times 10^{-7}$/° C. to $120 \times 10^{-7}$/° C. If it is less than $75 \times 10^{-7}$/° C., it tends to be difficult to adjust it to the thermal expansion coefficient of glass frit material. Preferably, it is at least $80 \times 10^{-7}$/° C. If it exceeds $120 \times 10^{-7}$/° C., thermal cracking may occur in the thermal treatment process. It is preferably at most $100 \times 10^{-7}$/° C.

The strain point of the plate glass of the present invention is at least 550° C. If it is lower than 550° C., deformation may occur, or thermal shrinkage tends to be large in the heat treatment process.

The density of the plate glass of the present invention at 20° C. is at most 2.65 g/cm$^3$. If it exceeds 2.65 g/cm$^3$, the plate glass tends to be too heavy. Preferably, it is at most 2.60 g/cm$^3$.

In a first embodiment of the plate glass of the present invention, it is not essential to contain BaO. However, BaO may be contained, and in such a case, the content is at most 0.8 mol %, and the oxygen atom density at 20° C. is from $7.2 \times 10^{-2}$ to $9.0 \times 10^{-2}$ mol/cm$^3$. If the content of BaO exceeds 0.8 mol %, or the oxygen atom density is less than $7.2 \times 10^{-2}$ mol/cm$^3$, it tends to be difficult to obtain fracture toughness of the same level or higher than the fracture toughness of soda lime silica glass (0.75 MPa·m$^{1/2}$ as measured by the above mentioned BBCN method and shown as the fracture toughness of glass A in Table 1). The oxygen atom density is preferably at least $7.3 \times 10^{-2}$ mol/cm$^3$, more preferably at least $7.4 \times 10^{-2}$ mol/cm$^3$. If the oxygen atom density exceeds $9.0 \times 10^{-2}$ mol/cm$^3$, the density tends to be too high.

In a second embodiment of the plate glass of the present invention, the oxygen atom density is from $7.4 \times 10^{-2}$ to $9.0 \times 10^{-2}$ mol/cm$^3$. If it is less than $7.4 \times 10^{-2}$ mol/cm$^3$, it tends to be difficult to obtain fracture toughness of the same level or higher than the fracture toughness of soda lime silica glass. If it exceeds $9.0 \times 10^{-2}$ mol/cm$^3$, the density tends to be too high.

In order to increase the oxygen atom density, the plate glass of the present invention contains B$_2$O$_3$.

To obtain the properties of the plate glass of the present invention, a glass having the following composition is, for example, preferred. Namely, it is a glass composition which consists essentially of:

| | |
|---|---|
| SiO$_2$ | 50 to 75 mol %, |
| Al$_2$O$_3$ | 4 to 20 mol %, |
| B$_2$O$_3$ | 0.5 to 10 mol %, |
| MgO | 2 to 15 mol %, |
| CaO | 1 to 15 mol %, |
| SrO | 0 to 6 mol %, |
| BaO | 0 to 0.8 mol %, |
| K$_2$O | 2 to 7 mol %, |
| Li$_2$O + Na$_2$O + K$_2$O | 2 to 13 mol %, |

-continued

| | |
|---|---|
| $ZrO_2$ | 0 to 5 mol %, |
| $TiO_2$ | 0 to 8 mol %, |
| $Y_2O_3$ | 0 to 2 mol %, |
| $Ta_2O_5$ | 0 to 2 mol %, and |
| $Nb_2O_5$ | 0 to 2 mol %. |

Here, "essentially" means that the total amount of components other than the above components is not more than 2 mol %. Now, the respective components of this preferred glass composition will be described.

$SiO_2$ is a network former and essential, and it is contained within a range of from 50 mol % to 75 mol %. If it is less than 50 mol %, the density tends to be too high. Preferably, it is at least 54 mol %. If it exceeds 75 mol %, the thermal expansion coefficient tends to be too small. Preferably, it is at most 68 mol %.

$Al_2O_3$ is a component effective for increasing the oxygen atom density and essential. If it is less than 4 mol %, the oxygen atom density tends to be low, or the strain point tends to be too low. Preferably, it is at least 6 mol %. On the other hand, if it exceeds 20 mol %, the thermal expansion coefficient tends to be too small. Preferably, it is at most 14 mol %.

$B_2O_3$ is a component effective for increasing the oxygen atom density and essential. If it is less than 0.5 mol %, the effect for increasing the oxygen atom density tends to be small. If it exceeds 10 mol %, the strain point tends to be too low. Preferably, it is at most 5 mol %.

MgO is a component effective for increasing the oxygen atom density and essential. If it is less than 2 mol %, the oxygen atom density tends to be low. Preferably, it is at least 3 mol %. On the other hand, if it exceeds 15 mol %, the thermal expansion coefficient tends to be too small. Preferably, it is at most 12 mol %.

CaO is a component effective for increasing the oxygen atom density and essential. If it is less than 1 mol %, the oxygen atom density tends to be low, or the thermal expansion coefficient tends to be too small. Preferably, it is at least 2 mol %. On the other hand, if it exceeds 15 mol %, devitrification is likely to result. Preferably, it is at most 12 mol %.

SrO is not essential, but in order to increase the thermal expansion coefficient, it may be incorporated up to 6 mol %. If it exceeds 6 mol %, the oxygen atom density tends to be low, or the density tends to increase. More preferably, it is at most 5 mol %.

BaO is not essential, but may be incorporated up to 0.8 mol % in order to increase the thermal expansion coefficient. If it exceeds 0.8 mol %, the oxygen atom density tends to be low, or the density tends to increase. More preferably, it is at most 0.5 mol %.

$Li_2O$ is not essential, but may be incorporated up to 10 mol % in order to increase the oxygen atom density. If it exceeds 10 mol %, the strain point tends to be too low. Preferably, it is at most 7 mol %.

$Na_2O$ is not essential, but is preferably incorporated within a range of from 4 mol % to 12 mol % in order to increase the thermal expansion coefficient. If it exceeds 12 mol %, the electrical insulating property tends to be low.

$K_2O$ is essential and incorporated within a range of from 2 mol % to 7 mol %, preferably at least 3 mol %, more preferably at least 4 mol %. If it is less than 2 mol %, the meltability of glass decreases. If it exceeds 7 mol %, the oxygen atom density decreases. Preferably, it is at most 6 mol %.

The total amount of $Li_2O$, $Na_2O$ and $K_2O$ is at most 13 mol % If it exceeds 13 mol %, the electrical insulating property tends to be low. The above total amount is preferably at least 4 mol %, more preferably at least 6 mol %. If it is less than 4 mol %, the thermal expansion coefficient tends to be too small, or the density tends to be too high.

$ZrO_2$ is not essential, but may be incorporated up to 5 mol % in order to increase the oxygen atom density. If it exceeds 5 mol %, the density tends to be too high. Preferably, it is at most 4 mol %.

$TiO_2$ is not essential, but may be incorporated up to 8 mol % in order to increase the oxygen atom density. If it exceeds 8 mol %, the density tends to be too high. Preferably, it is at most 6 mol %.

$Y_2O_3$, $Ta_2O_5$ and $Nb_2O_5$ are not essential, but may be incorporated up to 2 mol % each in order to increase the oxygen atom density. If each of them exceeds 2 mol %, the density tends to be too high. The total amount of $ZrO_2$, $TiO_2$, $Y_2O_3$, $Ta_2O_5$ and $Nb_2O_5$ is preferably at most 10 mol %. If it exceeds 10 mol %, the density tends to be too high. More preferably, the total amount is at most 5 mol %.

The plate glass of the present invention is preferably a plate glass wherein no phase splitting phenomenon has occurred. If a phase splitting phenomenon has occurred, there may be a case where the fracture toughness will not be improved even when the oxygen atom density is sufficiently high.

A substrate glass for electronics employing the plate glass of the present invention is a substrate glass for electronics, which has a thermal expansion coefficient of the same level as the thermal expansion coefficient of soda lime silica glass and a strain point higher than soda lime silica glass, and yet has fracture toughness of the same level or higher than the fracture toughness of soda lime silica glass.

Now, the present invention will be described in further detail with reference to Examples. However, it should be understood that the present invention is by no means restricted to such specific Examples.

EXAMPLES

Figure 1:
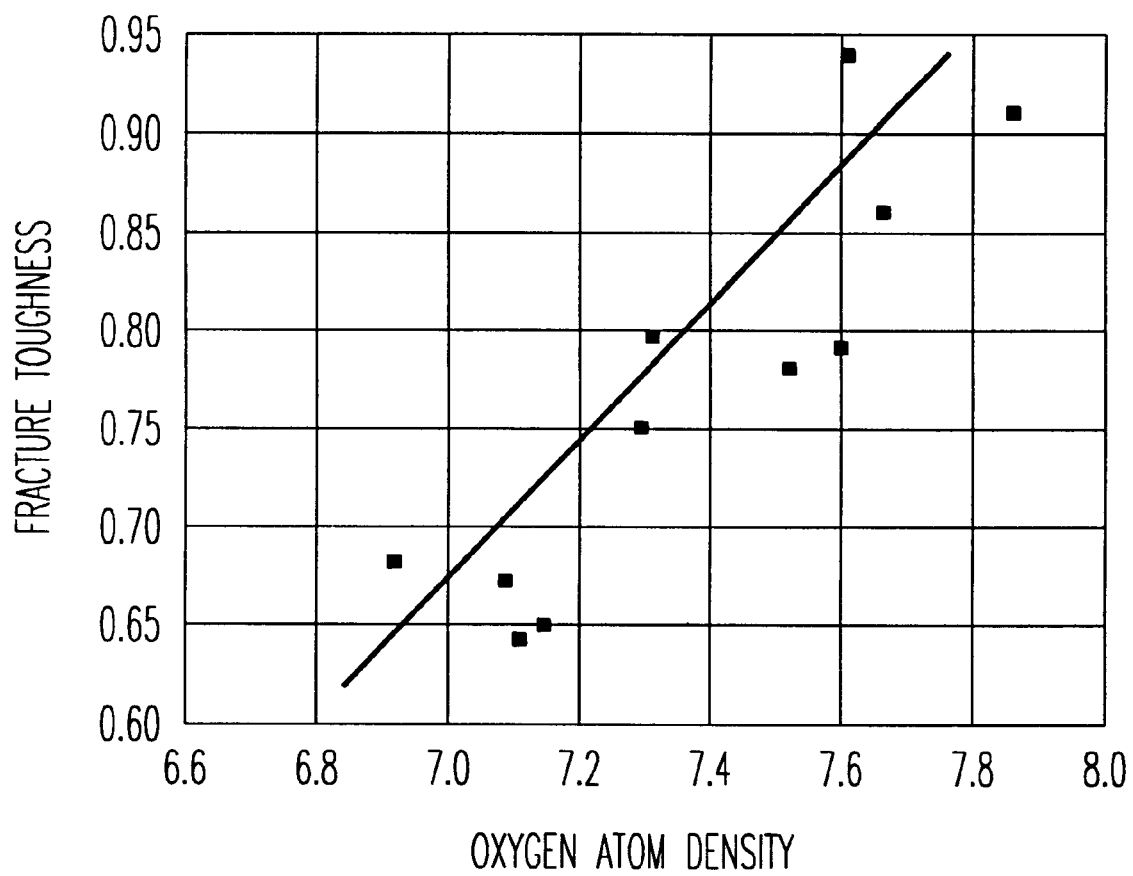
FIG. 1 is a graph showing the relationship between fracture toughness and oxygen atom density from the data presented in Table 1.

Glasses L, M, N, O and P having the compositions as identified in Table 3 by mol %, were prepared. Glasses L, M, N and O represent Examples of the present invention, and glass P represents a Comparative Example. With respect to glasses L, M, N, O and P, the fracture toughness, the density, the thermal expansion coefficient, the strain point, and the fracture strength ($\sigma_{100}$) were measured. Table 3 shows the fracture toughness (the unit being MPa·m$^{1/2}$) as measured by the BBCN method, the density (the unit being g/cm$^3$), the oxygen atom density (the unit being 10$^{-2}$ mol/cm$^3$), the thermal expansion coefficient (the unit being 10$^{-7}$/° C.), the strain point (the unit being ° C.) and the fracture strength (the unit being MPa).

As is evident from Table 3, the fracture toughness of glasses L, M, N and O having high oxygen atom densities, is the same or higher than the fracture toughness of soda lime silica glass (as shown in Table 1, the fracture toughness of glass A which is soda lime silica glass, is 0.75 MPa·m$^{1/2}$). Their fracture strength is also the same or higher than the fracture strength of soda lime silica glass (as shown in Table 1, the fracture strength of glass A which is soda lime silica glass, is 65 MPa). Thus, it is evident that as compared with conventional high strain point glasses (glasses B to C in Table 1) having fracture strength lower than the fracture strength of soda lime silica glass, their fracture strength is remarkably improved. Further, glasses L, M, N and O have a thermal expansion coefficient of the same level as the thermal expansion coefficient of soda lime silica glass, and a higher strain point, and their alkali contents are lower than soda lime silica glass, whereby they are excellent in the electrical insulating property, and thus it is evident that they have properties most suitable, for example, as a substrate glass for color PDP.

The plate glass of the present invention is intended to be a plate glass having high fracture toughness, while having properties required as a substrate glass for electronics. However, it can be applied to other uses.

TABLE 1

|  | Glass A | Glass B | Glass C | Glass D | Glass E | Glass F | Glass G | Glass H | Glass I | Glass J | Glass K |
|---|---|---|---|---|---|---|---|---|---|---|---|
| $SiO_2$ | 72.0 | 66.5 | 69.2 | 60.0 | 67.0 | 66.0 | 67.6 | 58.5 | 100 | 60 | 60 |
| $Al_2O_3$ | 1.1 | 4.7 | 2.5 | 10.0 | 7.8 | 11.0 | 11.5 | 12.1 | 0 | 0 | 20 |
| $B_2O_3$ | 0 | 0 | 0 | 5.0 | 6.0 | 7.0 | 8.7 | 3.5 | 0 | 16 | 0 |
| $Li_2O$ | 0 | 0 | 0 | 0 | 0 | 0 | 0 | 0 | 0 | 0 | 0 |
| $Na_2O$ | 12.6 | 4.8 | 2.0 | 2.0 | 0 | 0 | 0 | 1.0 | 0 | 24 | 20 |
| $K_2O$ | 0.2 | 4.4 | 9.5 | 8.0 | 0 | 0 | 0 | 0 | 0 | 0 | 0 |
| MgO | 5.5 | 3.4 | 7.0 | 5.0 | 3.6 | 6.4 | 1.4 | 18.3 | 0 | 0 | 0 |
| CaO | 8.6 | 6.2 | 8.0 | 10.0 | 4.0 | 4.8 | 5.2 | 6.6 | 0 | 0 | 0 |
| SrO | 0 | 4.7 | 0 | 0 | 4.5 | 4.8 | 1.3 | 0 | 0 | 0 | 0 |
| BaO | 0 | 3.6 | 0 | 0 | 7.1 | 0 | 4.3 | 0 | 0 | 0 | 0 |
| $ZrO_2$ | 0 | 1.7 | 1.8 | 0 | 0 | 0 | 0 | 0 | 0 | 0 | 0 |
| Fracture toughness | 0.75 | 0.64 | 0.68 | 0.65 | 0.78 | 0.86 | 0.79 | 0.91 | 0.80 | 0.94 | 0.67 |
| Density | 2.49 | 2.77 | 2.51 | 2.49 | 2.77 | 2.51 | 2.55 | 2.56 | 2.20 | 2.46 | 2.44 |
| Oxygen atom density | 7.30 | 7.11 | 6.92 | 7.15 | 7.53 | 7.68 | 7.60 | 7.88 | 7.32 | 7.61 | 7.09 |
| Thermal expansion coefficient | 85 | 83 | 83 | 83 | <50 | <50 | <50 | <50 | 5 |  |  |
| Strain point | 511 | 570 | 595 | 590 |  |  |  |  |  | <540 |  |
| Fracture strength | 65 | 56 | 54 |  |  |  |  | 83 |  |  |  |

TABLE 2

|  | Appen's coefficient molar volume | Oxygen atom density |
|---|---|---|
| $SiO_2$ | 26.1 to 27.25 | 7.34 to 7.66 |
| $Al_2O_3$ | 40.4 | 7.43 |
| $B_2O_3$ | 18.5 to 38 | 7.89 to 16.2 |
| $Li_2O$ | 11 | 9.09 |
| $Na_2O$ | 20.2 | 4.95 |
| $K_2O$ | 34.1 | 2.93 |
| MgO | 12.5 | 8.00 |
| CaO | 14.4 | 6.94 |
| SrO | 17.5 | 5.71 |
| BaO | 22 | 4.55 |
| ZnO | 14.5 | 6.90 |
| Pbo | 21 to 23.5 | 4.26 to 4.76 |
| $Ga_2O_3$ | 42.5 | 7.06 |
| $Y_2O_3$ | 35 | 8.57 |
| $La_2O_3$ | 40 | 7.50 |
| $Sb_2O_3$ | 47 | 6.38 |
| $Bi_2O_3$ | 45 | 6.67 |
| $SnO_2$ | 28.8 | 6.94 |
| $TiO_2$ | 19 to 22.5 | 8.89 to 10.53 |
| $ZrO_2$ | 23 | 8.70 |
| $Nb_2O_3$ | 56 | 8.93 |
| $Ta_2O_5$ | 52 | 9.62 |

TABLE 3

|  | Glass L | Glass M | Glass N | Glass O | Glass P |
|---|---|---|---|---|---|
| $SiO_2$ | 56 | 58 | 57 | 57 | 60 |
| $Al_2O_3$ | 9 | 8 | 9.5 | 9 | 8 |
| $B_2O_3$ | 3 | 4 | 4 | 4 | 2 |
| $Li_2O$ | 0 | 0 | 0 | 0 | 0 |
| $Na_2O$ | 12 | 7 | 6 | 5 | 0 |
| $K_2O$ | 0 | 4 | 4.5 | 5.5 | 18 |
| MgO | 10 | 9 | 6.5 | 6.5 | 6 |
| CaO | 10 | 10 | 11 | 10 | 6 |
| SrO | 0 | 0 | 0 | 1 | 0 |
| BaO | 0 | 0 | 0 | 0 | 0 |
| $ZrO_2$ | 0 | 0 | 1.5 | 2 | 0 |
| Fracture toughness | 0.80 | 0.75 | 0.80 | 0.78 | 0.64 |
| Density | 2.557 | 2.531 | 2.568 | 2.593 | 2.474 |
| Oxygen atom density | 7.42 | 7.30 | 7.29 | 7.24 | 6.52 |
| Strain point | 552 | 554 | 580 | 590 | 590 |
| Thermal expansion coefficient | 83 | 88 | 84 | 85 | 103 |
| Fracture strength | 72 | 65 |  |  | 53 |

According to the present invention, it is possible to obtain a high strain point plate glass which has a thermal expansion coefficient of the same level as the thermal expansion coefficient of soda lime silica glass and which is of a light weight and hardly breakable, and the plate glass is suitable as a substrate glass for electronics.

What is claimed is:

1. A plate glass containing $B_2O_3$ in an amount of at most 5 mol %, having a total content of $Li_2O$, $Na_2O$ and $K_2O$ of from 0 to 13 mol %, a content of BaO of from 0 to 0.8 mol % and a content of $SiO_2$ of from 50 to 75 mol %, and having an average linear thermal expansion coefficient of from $75 \times 10^{-7}$ to $120 \times 10^{-7}/°$ C. in a range of from 50 to 350° C., a strain point of at least 550° C., a density of at most 2.65 g/cm$^3$ at 20° C. and an oxygen atom density of from $7.2 \times 10^{-2}$ to $9.0 \times 10^{-2}$ mol/cm$^3$ at 20° C.

2. The plate glass according to claim 1, wherein the density is at most 2.60 g/cm$^3$ at 20° C.

3. The plate glass according to claim 1, which consists essentially of:

| | |
|---|---|
| $SiO_2$ | 50 to 75 mol %, |
| $Al_2O_3$ | 4 to 20 mol %, |
| $B_2O_3$ | 0.5 to 15 mol %, |
| MgO | 2 to 15 mol %, |
| CaO | 1 to 15 mol %, |
| SrO | 0 to 6 mol %, |
| BaO | 0 to 0.8 mol %, |
| $K_2O$ | 2 to 7 mol %, |
| $Li_2O + Na_2O + K_2O$ | 2 to 13 mol %, |
| $ZrO_2$ | 0 to 5 mol %, |
| $TiO_2$ | 0 to 8 mol %, |
| $Y_2O_3$ | 0 to 2 mol %, |
| $Ta_2O_5$ | 0 to 2 mol %, and |
| $Nb_2O_5$ | 0 to 2 mol %. |

4. The plate glass according to claim 1, which consists essentially of:

| | |
|---|---|
| $SiO_2$ | 54 to 68 mol %, |
| $Al_2O_3$ | 6 to 14 mol %, |
| $B_2O_3$ | 0.5 to 5 mol %, |
| MgO | 3 to 12 mol %, |
| CaO | 2 to 12 mol %, |
| SrO | 0 to 5 mol %, |
| BaO | 0 to 0.8 mol %, |
| $Li_2O$ | 0 to 10 mol %, |
| $Na_2O$ | 4 to 12 mol %, |
| $K_2O$ | 2 to 7 mol %, |
| $Li_2O + Na_2O + K_2O$ | 6 to 13 mol %, |
| $ZrO_2$ | 0 to 4 mol %, |
| $TiO_2$ | 0 to 6 mol %, |
| $Y_2O_3$ | 0 to 2 mol %, |
| $Ta_2O_5$ | 0 to 2 mol %, and |
| $Nb_2O_5$ | 0 to 2 mol %. |

5. A substrate glass for electronics employing the plate glass as defined in claim 1.

6. A plate glass containing $B_2O_3$ in an amount of at most 5 mol %, having a total content of $Li_2O$, $Na_2O$ and $K_2O$ of from 0 to 13 mol %, a content of $SiO_2$ of from 50 to 75 mol %, and having an average linear thermal expansion coefficient of from $75 \times 10^{-7}$ to $120 \times 10^{-7}/°$ C. in a range of from 50 to 350° C., a strain point of at least 550° C., a density of at most 2.65 g/cm$^3$ at 20° C. and an oxygen atom density of from $7.4 \times 10^{-2}$ to $9.0 \times 10^{-2}$ mol/cm$^3$ at 20° C.

7. The plate glass according to claim 6, wherein the density is at most 2.60 g/cm$^3$ at 20° C.

8. The plate glass according to claim 6, which consists essentially of:

| | |
|---|---|
| $SiO_2$ | 50 to 75 mol %, |
| $Al_2O_3$ | 4 to 20 mol %, |
| $B_2O_3$ | 0.5 to 15 mol %, |
| MgO | 2 to 15 mol %, |
| CaO | 1 to 15 mol %, |
| SrO | 0 to 6 mol %, |
| BaO | 0 to 0.8 mol %, |
| $K_2O$ | 2 to 7 mol %, |
| $Li_2O + Na_2O + K_2O$ | 2 to 13 mol %, |
| $ZrO_2$ | 0 to 5 mol %, |
| $TiO_2$ | 0 to 8 mol %, |
| $Y_2O_3$ | 0 to 2 mol % |
| $Ta_2O_5$ | 0 to 2 mol %, and |
| $Nb_2O_5$ | 0 to 2 mol %. |

9. The plate glass according to claim 6, which consists essentially of:

| | |
|---|---|
| $SiO_2$ | 54 to 68 mol %, |
| $Al_2O_3$ | 6 to 14 mol %, |
| $B_2O_3$ | 0.5 to 5 mol %, |
| MgO | 3 to 12 mol %, |
| CaO | 2 to 12 mol %, |
| SrO | 0 to 5 mol %, |
| BaO | 0 to 0.8 mol %, |
| $Li_2O$ | 0 to 10 mol %, |
| $Na_2O$ | 4 to 12 mol %, |
| $K_2O$ | 2 to 7 mol %, |
| $Li_2O + Na_2O + K_2O$ | 6 to 13 mol %, |
| $ZrO_2$ | 0 to 4 mol %, |
| $TiO_2$ | 0 to 6 mol %, |
| $Y_2O_3$ | 0 to 2 mol %, |
| $Ta_2O_5$ | 0 to 2 mol %, and |
| $Nb_2O_5$ | 0 to 2 mol %. |

10. A substrate glass for electronics employing the plate glass as defined in claim 6.

* * * * *